United States Patent
Doench et al.

(10) Patent No.: US 12,406,251 B1
(45) Date of Patent: Sep. 2, 2025

(54) SYSTEM AND METHOD OF PROVIDING ADVISOR CONTROLS OF CRYPTOCURRENCY TRANSACTIONS

(71) Applicant: Flourish Technologies LLC, New York, NY (US)

(72) Inventors: James Doench, New York, NY (US); Simon Gelinas, New York, NY (US); Maxwell Lane, New York, NY (US); James McAuslan, New York, NY (US); Ryan Solomon, New York, NY (US)

(73) Assignee: Flourish Technologies LLC, New York, NY (US)

( * ) Notice: Subject to any disclaimer, the term of this patent is extended or adjusted under 35 U.S.C. 154(b) by 141 days.

(21) Appl. No.: 17/956,322

(22) Filed: Sep. 29, 2022

Related U.S. Application Data

(60) Provisional application No. 63/250,005, filed on Sep. 29, 2021.

(51) Int. Cl.
*G06Q 20/36* (2012.01)
*G06Q 20/10* (2012.01)
(Continued)

(52) U.S. Cl.
CPC ......... *G06Q 20/3674* (2013.01); *G06Q 20/10* (2013.01); *G06Q 20/3678* (2013.01);
(Continued)

(58) Field of Classification Search
None
See application file for complete search history.

(56) References Cited

U.S. PATENT DOCUMENTS

| 10,540,654 B1 * | 1/2020 | James | G06Q 20/223 |
| 11,308,487 B1 * | 4/2022 | Foster | G06Q 20/389 |

(Continued)

FOREIGN PATENT DOCUMENTS

| WO | WO-2019043538 A1 * | 3/2019 | ............. G06Q 20/36 |
| WO | WO-2022243708 A1 * | 11/2022 | ............ G06Q 20/363 |

OTHER PUBLICATIONS

Goodell, Geoffrey, et al. "A Digital Currency Architecture for Privacy and Owner-Custodianship," Future Internet, vol. 13, No. 5, MDPI AG, 2021, p. 130, https://doi.org/10.3390/fi13050130. (Year: 2021).*

(Continued)

*Primary Examiner* — Eduardo Castilho
(74) *Attorney, Agent, or Firm* — Foley & Lardner LLP

(57) ABSTRACT

A method may include receiving, by a processor, from a first computing device, a request associated with a first user credential on behalf of a second user credential to transact cryptocurrency, the amount of cryptocurrency corresponding to a first block instance of a blockchain stored on a plurality of first network nodes, wherein the second user credential has a set of permissions for transactions of the cryptocurrency on the blockchain, and the first user credential has a subset of the set of permissions for transactions of the cryptocurrency on the blockchain and excludes transactions directly to a cryptocurrency account; in response to determining that the first user credential has a permission to make the request, updating, by the processor, based on the request and the second user credential, the amount of cryptocurrency associated with the second user credential by updating a second block instance associated with the blockchain.

20 Claims, 10 Drawing Sheets

(51) Int. Cl.
*G06Q 20/38* (2012.01)
*G06Q 40/04* (2012.01)

(52) U.S. Cl.
CPC .......... *G06Q 20/389* (2013.01); *G06Q 40/04* (2013.01); *G06Q 2220/00* (2013.01)

(56) References Cited

U.S. PATENT DOCUMENTS

| | | | | |
|---|---|---|---|---|
| 2003/0222135 | A1* | 12/2003 | Stoutenburg | G06Q 20/4037 235/379 |
| 2008/0215477 | A1* | 9/2008 | Annunziata | G06Q 40/04 705/37 |
| 2009/0112775 | A1* | 4/2009 | Chiulli | G06Q 40/04 705/37 |
| 2016/0342994 | A1* | 11/2016 | Davis | G06Q 20/382 |
| 2016/0350749 | A1* | 12/2016 | Wilkins | G06Q 20/401 |
| 2017/0011460 | A1* | 1/2017 | Molinari | H04L 9/3247 |
| 2017/0213212 | A1* | 7/2017 | Dicker | G06Q 20/401 |
| 2020/0020032 | A1* | 1/2020 | Bleznak | G06Q 20/223 |
| 2020/0167761 | A1* | 5/2020 | Vityaz | G06Q 20/351 |
| 2021/0158443 | A1* | 5/2021 | Kilgore | G06Q 20/223 |
| 2021/0192517 | A1* | 6/2021 | Barnes | G06Q 20/389 |
| 2021/0377045 | A1* | 12/2021 | Doney | H04L 9/3247 |

OTHER PUBLICATIONS

G. Goodell, H. D. Al-Nakib, and P. Tasca, "A Digital Currency Architecture for Privacy and Owner-Custodianship," Future Internet, 2021, vol. 13, No. 5, p. 130, May 2021. (Year: 2021).*

* cited by examiner

700

- 702 — (A client) logging into a WMS system or website
- 704 — Landing on a WMS client dashboard
- 706 — Navigating to a WMS crypto account via an account manager
- 708 — Entering order details for a crypto order
- 710 — Placing, via the crypto manager, an order
- 712 — Routing, by the crypto manager, the order to a CBS via an API
- 714 — Filling, by the CBS, the order and returning, by the CBS, execution details to the crypto manager via API
- 716 — Displaying, by the crypto manager, execution details
- 718 — Displaying, by the crypto manager, balance and Activity pages which reflect an executed trade

802 — (An advisor) logging into a WMS system or website

804 — Navigating to an advisor dashboard and navigating to a desired client household 806 — Navigating to a WMS crypto account via a crypto manager 808 — Entering order details for a crypto order 810 — Placing, via the crypto manager, an order 812 — Routing, by the crypto manager, the order to a CBS via an API 814 — Filling, by the CBS, the order and returning, by the CBS, execution details to the crypto manager via API 816 — Displaying, by the crypto manager, execution details 818 — Displaying, by the crypto manager, balance and Activity pages which reflect an executed trade

1002 — Receiving, by a processor, from a first computing device, a first request associated with a first user credential on behalf of a second user credential to transact cryptocurrency, the amount of cryptocurrency corresponding to a first block instance of a blockchain stored on a plurality of first network nodes 1004 — In response to determining that the first user credential has a permission to make the first request, updating, by the processor, based on the request and the second user credential, a cryptocurrency wallet associated with the first user in accordance with the amount of cryptocurrency associated with the second user credential and the transaction by updating a second block instance associated with the blockchain.

FIG. 10

SYSTEM AND METHOD OF PROVIDING ADVISOR CONTROLS OF CRYPTOCURRENCY TRANSACTIONS

CROSS-REFERENCE TO RELATED APPLICATION

This application claims priority to U.S. Provisional Patent Application No. 63/250,005, filed Sep. 29, 2021, which is incorporated by reference in its entirety for all purposes.

TECHNICAL FIELD

This application is generally directed towards a cryptocurrency management system, and more specifically towards systems and methods for providing investment advisors with controls of cryptocurrency transactions on behalf of their clients.

BACKGROUND

There are two broad categories of conventional cryptocurrency (or "crypto") options for investment advisors (e.g., registered investment advisors (RIAs)) to use on behalf of their clients: (1) private crypto funds and (2) retail direct ownership solutions. Private crypto funds (e.g., Grayscale™, Osprey™, etc.) have a ticker and are available on major custodians like Schwab™ and Fidelity™ so that they can access the RIA technology ecosystem by being available on major custodian platforms. However, private crypto funds may charge high fees, incur net asset value (NAV) tracking errors (discounts and premiums) through fund vehicles, and/or there may be liquidity constraints.

Retail direct ownership solutions (e.g., Coinbase™, Gemini™, Binance™, PayPal™, Robinhood™, etc.) may provide easy-to-use products and may not incur tracking errors. They generally do not have data connections into the RIA technology ecosystem, so assets may be held away, meaning they cannot be easily seen, traded, or billed on by RIAs. Retail direct ownership solutions may also charge high transaction fees. There is a need for a direct ownership crypto solution that can overcome the above-noted drawbacks of the current crypto options available to RIAs while providing easy-to-use products and better connectivity with the RIA technology ecosystem.

SUMMARY

For the aforementioned reasons, there is a need for a crypto solution that can overcome the above-noted drawbacks of the current crypto options available to RIAs while providing easy-to-use products and better connectivity with the RIA technology ecosystem.

Using the methods and systems described herein, a processor or a server of a wealth management system (WMS) can provide multi-tiered access to an electronic account that can trade and custody cryptocurrencies. For instance, the WMS can generate an electronic account that allows multiple types of access to that account, with each having a different permission level. Using this multi-tiered access based on different permission levels, the WMS may regulate the transactions requested by different users accessing the electronic account.

Using the methods and systems described herein, the WMS may generate two sets of user credentials where both sets of user credentials allow access to an electronic account that can trade and custody cryptocurrencies. The first set of user credentials may belong to a cryptocurrency owner. The first set of user credentials may correspond to a permission level that allows the user to conduct any transaction (e.g., unfettered access to the electronic account to buy or sell cryptocurrency or transfer cryptocurrency to another account). The second set of user credentials may belong to an advisor of the cryptocurrency owner. The second set of user credentials may include a limited amount of access (e.g., a subset of the permissions granted to the cryptocurrency owner). For instance, when the advisor accessed the account using the second set of user credentials, the advisor can buy or sell cryptocurrency on behalf of the cryptocurrency owner. However, the advisor cannot transfer cryptocurrency to another account. In another example, the advisor may be permitted to buy or sell cryptocurrencies and process US Dollar transactions in and out of the account on behalf of the cryptocurrency owner. The advisor's permission may be dynamically revised. For instance, upon receiving instruction from a cryptocurrency owner, the WMS may revise the advisor's permission levels (e.g., limit the advisor to only buying cryptocurrency or limit the advisor to selling up to a certain amount).

Using the methods and systems described herein, the WMS allows a cryptocurrency owner to allow an advisor to manage their blockchain-based assets while limiting the risk of fraudulent activity or wrongdoing. For instance, cryptocurrency owners can allow access to their account and allow advisors to transact on their behalf while the WMS ensures that the advisor cannot conduct inappropriate transactions (e.g., transfer cryptocurrency to an account or collect inappropriate fees).

As used herein, an account, refers to an electronic account provided by the WMS that provides access to cryptocurrency owned by one or more users. For instance, an account provided by the WMS may allow the user to view their cryptocurrency. The WMS may also allow users to transact using their cryptocurrency, for instance, send or receive cryptocurrency to and from other users or entities or invest using their cryptocurrency. The cryptocurrency associated with users and accounts may be held in one or more electronic wallets that allow direct interaction with a blockchain associated with the cryptocurrency. In some configurations, the cryptocurrency owned by a set of users (via their respective accounts) may be held in a collective wallet (e.g., a centralized wallet that holds all the cryptocurrency or an "omnibus" wallet).

In a non-limiting example, a user's account (provided by WMS) may correspond to an electronic wallet controlled by a different entity (e.g., crypto brokerage system (CBS)). The electronic wallet may be associated with multiple users and used as a collective account holding cryptocurrency for multiple users. In some configurations, the user may be assigned a phantom wallet that is associated with a subset of the cryptocurrency held in the collective wallet. For instance, the user may be assigned a phantom wallet for the purposes of moving cryptocurrency in and out of the collective wallet. The user (cryptocurrency owner or their advisor) may access their account and instruct the WMS to perform a transaction. Using the methods and systems discussed herein, the WMS may first determine whether the user has the authorization to order such transaction. If so, the WMS may instruct the CBS to perform the transaction and update the wallet (whether the collective wallet or the phantom wallet) accordingly.

The CBS may monitor various transactions and update the wallet and/or the underlying blockchain accordingly. Therefore, updating the blockchain may not occur with each transaction (e.g., in some configurations, CBS may update the blockchain once a day or sometimes may not update the blockchain at all for a period of time). Accordingly, the account provided by the WMS may not provide direct access to the user's wallet and therefore may not provide the direct ability for the user to interact with the underlying blockchain associated with the user's cryptocurrency. As described herein, the WMS will instruct the CBS to conduct the transaction and (when necessary) update the blockchain. In one embodiment, a method may include receiving, by a processor, from a first computing device, a first request associated with a first user credential on behalf of a second user credential to transact cryptocurrency, the amount of cryptocurrency corresponding to a first block instance of a blockchain stored on a plurality of first network nodes, wherein the second user credential has a set of permissions for transactions of the cryptocurrency on the blockchain, and wherein the first user credential has a subset of the set of permissions for transactions of the cryptocurrency on the blockchain and excludes transactions directly to a cryptocurrency account; and in response to determining that the first user credential has a permission to make the first request, updating, by the processor, based on the request and the second user credential, a cryptocurrency wallet associated with the first user in accordance with the amount of cryptocurrency associated with the second user credential and the transaction by updating a second block instance associated with the blockchain.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

FIG. 7 illustrates a flow diagram of a process executed for a client placing a crypto trade or order, according to an embodiment.

FIG. 8 illustrates a flow diagram of a process executed for an advisor placing a crypto trade or order, according to an embodiment.

FIG. 10 illustrate flow diagrams of a process executed to update an amount of cryptocurrency associated with a second user credential based on a first user credential, according to an embodiment.

DETAILED DESCRIPTION

Figure 1:
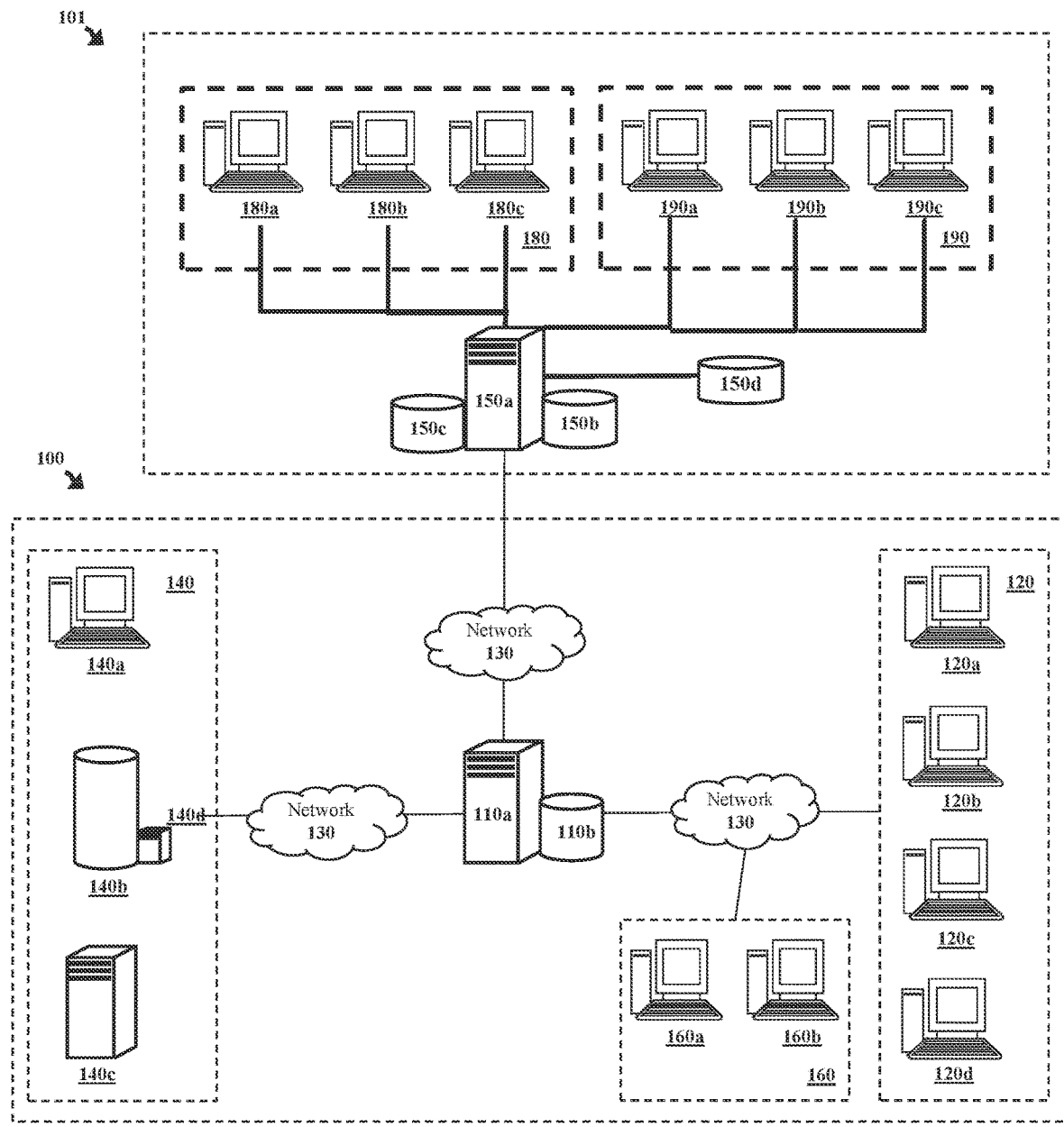
FIG. 1 illustrates components of a wealth management environment, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

One problem relates to providing crypto (or cryptocurrency) investment solutions that meet RIA's unique regulatory needs. For example, there is RIA's need or desire for (1) RIA-specific crypto solutions to meet growing demand, (2) safe, secure, and compliant crypto custody and execution solutions from trusted brand, (3) an option to have discretion over crypto allocations, and/or (4) an option to bill on crypto allocations. There is also the RIA end client's need or desire for access to crypto via their financial advisors.

To solve these problems, according to certain aspects, embodiments in the present disclosure relate to techniques for providing a direct ownership solution built exclusively to meet RIA's unique technology, business model, regulatory, and practice management needs. In some embodiments, a wealth management system (WMS) may provide crypto accounts to RIA end clients with an option to fund crypto transactions from its cash accounts. Clients of WMSs can use this option to fund their crypto accounts from their cash accounts, and fund their crypto accounts from external bank accounts.

In some embodiments, a WMS (e.g., a system, a server, or a website) may allow clients to open new crypto accounts via a user interface (UI), e.g., graphical user interfaces (GUI). The WMS may allow clients to buy and sell crypto via the UI. The WMS may allow end clients to view crypto positions and activity. The WMS may allow end clients to view statements. The WMS may have separate accounts for crypto positions (e.g., positions cannot be commingled with cash accounts). The WMS may allow clients to initiate cash transactions between cash accounts and crypto accounts. The WMS may allow clients to initiate cash transactions between crypto accounts and external bank accounts. The WMS may allow advisors (e.g., RIAs) to buy and sell crypto via the UI. The WMS may provide live pricing via the UI. The WMS may pipe crypto position data into key integration partners (e.g., Orion, Tamarac, eMoney, Addepar, BlackDiamond).

In some embodiments, a WMS may send trade and transfer notifications to clients. The WMS may allow advisors to view client crypto accounts and positions via an advisor dashboard filtered by crypto accounts over which they have discretion. The WMS may provide a learn page or a training page on a crypto account. The WMS may have a robust frequently asked questions (FAQ) on its crypto accounts and cryptocurrency in general. The WMS may support collection of transaction fees for crypto accounts. The WMS may support collection of custody fees for crypto accounts. The WMS may support all account types for its crypto accounts. The WMS may allow clients to wire funds into a crypto account directly. The WMS may support other account types beyond individual/personal crypto accounts. For example, the WMS may also support account types of joint, individual trust, joint trust, or institution, and the like.

In some embodiments, a WMS may have or provide a crypto themed user invitation. The WMS may allow advisors to prefill crypto accounts via advisor account initiation (AAI). The WMS may allow advisors or clients to trade crypto assets 24 hours a day. The WMS may allow clients to grant advisors trading discretion via the UI. The WMS may allow clients to grant transfer permission to their advisor to create transfers to or from their crypto accounts and their cash accounts. The WMS may allow clients to grant transfer permission to their advisor(s) to create transfers to or from their crypto accounts and external bank accounts. The WMS may send trade and transfer notifications to advisors regarding crypto accounts. In some embodiments, the WMS may send trade and transfer notifications to advisors regarding only such crypto accounts in which the advisors are involved or if the advisors have discretion over the accounts. The WMS may have capabilities to accept trades via an order management system (OMS) and reporting partners (e.g., Tamarac, Orion, Black Diamond, Addepar). In some embodiments, the WMS may have capabilities to accept a single trade as well as trades in bulk from order management systems and via the WMS UI. The WMS may allow advisors to bill on crypto positions. In some embodiments, the WMS may allow advisors to bill on crypto positions based on an average monthly value and/or an end of period value.

Another problem relates to providing a way for a wealth management system (WMS) and a crypto brokerage system (CBS) to earn revenue from crypto asset trade/custody business. The WMS and the CBS may need (1) a process to set and change gross transaction fees, (2) a process to set and change gross custody fees, (3) a process to reconcile revenue shares of gross transaction fees, and (4) a process to reconcile revenue shares of gross custody fees.

To solve these problems, according to certain aspects, embodiments in the present disclosure relate to techniques for performing collection of two types of crypto account fees: transaction fees and custody fees and sharing the crypto account fees between a WMS and a CBS. In some embodiments, the CBS may collect the gross fees from customer accounts and remit the WMS's share of the revenue asynchronously via respective billing systems (e.g., billing manager software) of the WMS and the CBS.

In some embodiments, the CBS may implement a process to collect the gross fees. The CBS may implement a process to collect transaction fees automatically at time of transaction. The CBS may implement a process to collect custody fees quarterly to align with quarterly billing schedules that are standard in the RIA market. The WMS may define a hierarchy in a billing system such that USD is taken first before any crypto assets are sold. The WMS may implement a process to sell crypto assets to pay custody fees if a given account has insufficient USD.

In some embodiments, the WMS and the CBS may implement a process to waive transaction fees on crypto asset sales initiated to pay custody fees.

In some embodiments, the CBS may automatically calculate and debit transaction fees at time of transaction. For example, a fee should automatically be taken from a customer account based on the gross trade amount. In some embodiments, a CBS API may return a fee along with a crypto asset purchase and/or a sale transaction when querying the API. The CBS may implement a process to debit the gross custody from customer account and transfer the funds to a CBS revenue account.

In some embodiments, the WMS may implement a process for reconciling the custody fees prior to debiting the fees. In some embodiments, the process for reconciling the custody fees may include a manual reconciliation between the respective operations teams of the WMS and the CBS. The WMS and the CBS may implement a process for agreeing to, setting, and changing gross transaction and custody fees. In some embodiments, the process for agreeing to, setting, and changing gross transaction and custody fees may include a manual process between the respective operations and/or finance teams of the WMS and the CBS. For example, authorized individuals can agree to fee changes and appropriate lead time to implement changes.

In some embodiments, the CBS may implement a process for remitting WMS's share of revenue periodically. For example, WMS's share of transaction fees may be remitted monthly or quarterly, and WMS's share of custody fees may be remitted quarterly. In calculating the custody fee, the daily crypto positions market value may be marked as of midnight UTC every calendar day. Last transaction price may be used to calculate a market value denominated in US Dollars, for example, using the equation: quantity*last transaction price=market value in US Dollars. The daily average crypto position market value for the quarter may be calculated using those end-of-day (EOD) calculations of market value as of UTC midnight or some other agreed upon time between the WMS and CBS. The custody fee may be applied to the daily average crypto position market value.

In some embodiments, the CBS or the WMS may create a billing system to run quarterly to debit gross custody fees from WMS customer accounts. Custody fees may be assessed daily at midnight UTC based on the then current total amount of crypto assets (excluding cash positions) being held by the CBS. In some embodiments, custody fees may be assessed daily at midnight UTC or some other agreed upon time between the WMS and CBS.

In some embodiments, the billing system may have logic to implement a debiting hierarchy. The billing system may determine whether a total account balance in an account (crypto positions market value+US Dollar position) is greater than or equal to the custody fee due that period. In response to determining that the total account balance is greater than or equal to the custody fee due that period, then the billing system may determine whether USD balance in an account is greater than or equal to the custody fee due that period. In response to determining that USD balance in an account is greater than or equal to the custody fee due that period, the billing system may debit the full fee from the account's USD balance. In response to determining that USD balance in an account<the custody fee due that period, then the billing system will debit the full USD balance and initiate a sale of crypto assets to cover the difference. Alternatively, in some embodiments, in response to determining that USD balance in an account<the custody fee due that period, the billing system will not debit any USD from the account and instead initiate a sale of crypto assets to cover the full fee. In some embodiments, the transaction fee for any cryptoasset trade to pay custody fees may be waived. The billing system may determine whether the account holds greater than 1 crypto position (e.g., BTC and ETH). In response to determining that the account holds greater than 1 crypto position, the billing system may determine to place sales pro rata, place sales exclusively from the largest position, the longest held position, the shortest held position, the least appreciated position, the highest appreciated position, or some other means.

In some embodiments, in response to determining that a total account balance in an account<the custody fee due that period, then the billing system may determine whether a total account balance in an account (crypto positions market value+US Dollar position) is greater than 0. In response to determining that the total account balance in an account is greater than 0, then a sale of all crypto assets may be initiated to partially cover the fee and the account may be recorded for an error report. In response to determining that the total account balance in an account equals 0, then the account may be recorded for an exception report. The WMS may use the exception report to procure fees owed from customers.

In some embodiments, the CBS or the WMS may implement a process to rerun the CBS's custody fee billing system for specific accounts after the initial debit date to capture fees paid late. The CBS's custody fee billing system may be run 5-15 days after the end of the calendar quarter to give the WMS customers ample time to get USD into their accounts. The WMS may implement a process to encumber USD/crypto on the accrued fees to date to mitigate risk of insufficient funds in the WMS accounts. The WMS may implement a process to pay custody fees from customers' cash accounts via recurring transfers.

Second, some embodiments can provide useful techniques for designing a clean billing solution that requires very little customer involvement so as to be beneficial to both WMS and CBS. Both the WMS and the CBS can ensure fees are appropriately collected to earn revenue. Both the WMS and the CBS can be incentivized for this process to be as seamless and smooth as possible to avoid instances where crypto accounts have insufficient funds to pay custody fees.

FIG. 1 illustrates components of a wealth management environment, according to an embodiment. FIG. 1 illustrates components of a wealth management environment including a wealth management system (WMS) 100 and a crypto brokerage system (CBS) 101.

The WMS 100 may include a WMS server 110a, system database 110b, client computing devices 120a-d (collectively client computing devices 120), advisor (e.g., RIA) computing devices 160a-d (collectively advisor computing devices 160), and electronic data sources 140a-c (collectively electronic data source 140). The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums. The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets, or another standard or proprietary wireless communication protocol. In another example, the network 130 may also include communications over a cellular network, including, e.g., a GSM (Global System for Mobile Communications), CDMA (Code Division Multiple Access), EDGE (Enhanced Data for Global Evolution) network.

The WMS 100 is not confined to the components described herein and may include additional or alternate components, not shown for brevity, which are to be considered within the scope of the embodiment.

The WMS server 110a may generate and display a graphical user interface (GUI) on each client computing device 120 or each advisor (e.g., RIA) computing device 160. An example of the trading GUI generated and hosted by the WMS server 110a may be a web-based application or a website configured to be displayed on different electronic devices, such as mobile devices, tablets, personal computer, and the like. The WMS server 110a may host a website accessible to end-users, where the content presented via the various webpages may be controlled based upon each particular user's role or viewing permissions. The WMS server 110a may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single WMS server 110a, in some configurations, the WMS server 110a may include any number of computing devices operating in a distributed computing environment.

The WMS server 110a may execute software applications configured to display the trading GUI (e.g., host a website), which may generate and serve various webpages to each client computing device 120 or each advisor computing device 160. Different users operating the client computing devices 120 or the advisor computing devices 160 may use the website to view entity/portfolio valuations, transmit bids and/or purchase requests associated with their WMS accounts. If a client's account is set to be discretionary or the client gives a permission to an advisor, the advisor (or the corresponding advisor computing device 160) may use the website to view entity/portfolio valuations, transmit bids and/or purchase requests associated with the client's account, on behalf of the client.

In some implementations, the WMS server 110a may be configured to require user authentication based upon a set of user authorization credentials (e.g., username, password, biometrics, cryptographic certificate, and the like). In such implementations, the WMS server 110a may access the system database 110b configured to store user credentials, which the WMS server 110a may be configured to reference in order to determine whether a set of entered credentials (purportedly authenticating the user) match an appropriate set of credentials that identify and authenticate the user.

In some configurations, the WMS server 110a may generate and host webpages based upon a particular user's role within the WMS 100 (e.g., administrator, employee, and/or bidder). In such implementations, the user's role may be defined by data fields and input fields in user records stored in the system database 110b. The WMS server 110a may authentication the user and may identify the user's role by executing an access directory protocol (e.g. LDAP). The WMS server 110a may generate webpage content that customized according to the user's role defined by the user record in the system database 110b. For instance, a user may not have proper authorization to view certain entities valuations. In another example, a user may not be able to transmit purchase requests regarding one or more prohibited entities or one or more portfolios including certain prohibited private entities.

In some configurations, the WMS server 110a may define or specify a client-advisor relationship stored in the system database 110b, e.g., which advisor or advisors are associated with each client. The WMS server 110a may specify, in the system database 110b, whether each client account is discretionary or not. The WMS server 110a may specify, in the system database 110b, whether an advisor has a trading permission with respect to a particular crypto account, and/or a particular client.

The electronic data source 140 may represent various electronic data sources that contain data associated with private entities. For instance, database 140c and third-party server 140b may represent database/server having private or public market data associated with different private entities. Non-limiting examples of database 140c may include databases continuously updated with market data (e.g., S&P 500) including cryptocurrency values. In some non-limiting examples, as described below, data associated with private entity may be inputted by a user operating the computing device 140a. For instance, an administrator may input various public or nonpublic data into a graphical user interface displayed on the computing device 140a where the WMS server 110a may use the inputted data to valuate a portfolio. In some embodiments, the WMS server 110a may utilize the application programming interface (API) 140d to monitor market data within the electronic data sources 140.

Client computing devices 120 or advisory computing devices 160 may be any computing device comprising a processor and a non-transitory machine-readable storage medium capable of performing the various tasks and processes described herein. Non-limiting examples of a network node may be a workstation computer, laptop computer, tablet computer, and server computer. In operations, various users may use computing devices 120 or computing devices 160 to access the trading GUI operationally managed by the WMS server 110a. Using the trading GUI, each computer may view valuation of different private entities and different portfolios.

The CBS 101 may include a CBS server 150a as a cryptocurrency trading/custody server, distributed network nodes 180a-c, and distributed network nodes 190a-c. Similar to public trading, a client operating the computing devices 120 or an advisor operating the computing devices 160 (on behalf of their clients) may transmit a cryptocurrency purchase order using the GUI of the WMS server 110a. Upon receiving the cryptocurrency purchase order, the WMS server 110a may transmit the cryptocurrency purchase order, along with different attributes of the purchase order such as amount, limit pricing, volume, and the like, to the cryptocurrency trading server 150a. The cryptocurrency trading server 150 may then facilitate a transaction using data received from the WMS server 110a. For instance, the cryptocurrency trading server 150a may transmit payments from the requesting party and may issue purchase confirmation once the transaction is completed.

The CBS 101 may also include database 150b, a key storage database 150c, volatile data storage 150d. Aspects of the CBS 101 may be configured to employ and manage a first cryptocurrency blockchain, sometimes referred to in the art as a "distributed ledger," and may include blockchain-based distributed ledger software (e.g., Hyperledger, Ethereum, Openchain, and TerraLedger). The first cryptocurrency blockchain may operate as a distributed database that stores data records associated with users' cryptocurrency and transaction documents, where the data records stored on the first cryptocurrency blockchain may be blocks of data (e.g., block instances) that are hosted (e.g., locally stored) on distributed network nodes 180a-c or different databases associated with said nodes. Similarly, the CBS 101 may be configured to employ and manage a second cryptocurrency blockchain where the data records stored on the secodn cryptocurrency blockchain may be blocks of data (e.g., block instances) that are hosted (e.g., locally stored) on distributed network nodes 190a-c. The first and second cryptocurrency blockchains may represent two different kinds of cryptocurrency.

The data stored in records within databases 150b may vary from the data stored in blocks of the respective cryptocurrency blockchain hosted on network nodes 180a-c or network nodes 190a-c. Furthermore, each block may not be accessible to other network nodes, however the CBS server 150a may access all block instances. The CBS server 150a may also store one or more block instances in the database 150b. In some embodiments, the CBS server 150a may generate a duplicate of one or more block instances within a cryptocurrency blockchain and store said block instances in the database 150b. While the CBS server 150a may dictate accessibility and transmit instructions to other parties within CBS 101, each network node within the distributed network nodes 180a-c or the distributed network nodes 190a-c (e.g., creator of the block instance) or the client (via client computing device 120 or advisor computing device 160) may prevent others within CBS 101 from accessing at least portions of the data within one or more block instances. For example, while generating a block instance, the CBS server 150a may designate a portion of the data within the block instance as private.

The CBS server 150a may also generate, access, and update blockchain instances hosted on network nodes 180a-c or blockchain instances hosted on network nodes 190a-c, according to instructions received from the WMS server 110a. Software executed by the CBS server 150a may provide blockchain services to users interacting with the CBS server 150a. For example, the CBS server 150a may render cryptocurrency blockchain services (e.g., order, trade, custody, or billing) to the client computing device 120 or the advisor computing device 160 via a CBS API in the WMS server 110a. In some embodiments, the CBS server 150a may update and query records in the database 150b according to the instructions received from the client computing device 120 or the advisor computing device 160 via the CBS API in the WMS server 110a.

The CBS server 150a may then generate block instances for a cryptocurrency blockchain, where the block instances contain data from the records of the database 150b. The CBS server may then update a local instance of the database 150b, and subsequently instruct network nodes 180a-c or 190a-c to update the instances of the cryptocurrency blockchain stored locally on each of the network nodes 180a-c or 190a-c. The CBS server 150a may generate each new block instance with a timestamp or other data that links the new block instance with existing block instances on the blockchain. As an example, when the CBS server 150a generates a new user record in the database 150b, the CBS server 150a then generates a hash value for the user based upon one or more data fields of the user record. The CBS server 150a then generates a new block instance for the cryptocurrency blockchain within the local instance of the blockchain stored in the CBS server 150a (or a database associated with the CBS server 150a). The CBS server 150a then transmits the updated block instance to each respective network node 180a-c or 190a-c. The network nodes 180a-c or 190a-c, in turn, may update the local instances of the blockchain stored on each of the network nodes 180a-c or 190a-c.

The volatile data storage 150d may be a static random access memory structure that retains data bits in its memory as long as power is being supplied. Unlike dynamic RAM, which stores bits in cells consisting of a capacitor and/or a transistor, the volatile data storage 150d may utilize a memory storage system that does not have to be periodically refreshed. The volatile data storage 150d provides faster access to data. In a non-limiting example of the memory structure utilized by the volatile data storage 150d may be a cache memory system. Cache memory is a high-speed static random access memory that allows a computer microprocessor to access the content stored more quickly than regular random access memory.

As described below, the CBS server 150a may create a blockchain based on data stored on to the volatile data storage 150d, instead of creating a block instance for the data received. This process improves quality of the blockchain (e.g., because all block instances correspond to a uniform interval) and requires less computing power. Furthermore, the CBS server 150a may also purge the volatile memory 150d periodically or after creating and/or updating the users' blockchain. In this way, the CBS server 150a ensures that users' data is stored on to their respective blockchains, which decreases the chances of data compromise.

In operation, when a user instructs the CBS server 150a to conduct a service requiring a query of the block instances of the blockchain or when a user (or a network node) requires modification/update of a block instance, the CBS server 150a may conduct a poll of all the parties associated with the blockchain (e.g., the network nodes 180a-c, 190a-c, the client computing device 120 or the advisor computing device 160) to identify the queried or modified data, based on the hash values identifying the block instances, and then determine whether the data within the identified block instances is accurate. The CBS server 150a may then await a response from a predetermined quorum of network nodes 180a-c, 190a-c, the client computing device 120 or the advisor computing device 160 to confirm the data in the blocks. The CBS server 150a may then proceed with a rendering the service or modifying the block using the data blocks of the blockchain, if a predetermined threshold number of network nodes 180a-c or 190a-c indicates that the blocks at issue match the blocks of the instance stored locally on each of the network nodes 180a-c or 190a-c, or approve the modification.

In some configurations, a pre-determined number of quorums may always not be necessary to proceed. For example, when the CBS server receives an instruction from the client computing device 120 or the advisor computing device 160 to update a blockchain associated with a previous cryptocurrency amount (stored in node 180b), the CBS server may await receipt of approval from 180b even if a quorum is met.

The CBS server 150a may generate block addresses for data to be retrieved from blockchain instances of the cryptocurrency blockchain. Machine-readable computer files containing various forms of documents (e.g., PDF, DOC, and XLS) may be uploaded and stored into the database 150b. The CBS server 150a may also generate a hash value of the document, where an application uses the hash value or other identifier values to reference the file from the database 150b. The CBS server 150a may then generate the block address for the file by generating a hash of the document and a hash value of the immediately preceding block data or block address. This block address may then be stored into the database 150b in a document record along with the file and any number of additional data field entries related to the computer file.

In operation, the CBS server 150a or network nodes 180a-c or 190a-c may reference the block of the blockchain containing the file according to the block address. The CBS server 150a may generate additional blocks and corresponding block addresses on the cryptocurrency blockchain in a similar manner (e.g., generating a hash value for a block containing user data and then generating a new block address using the block address of the preceding block). Block addresses may be generated in any number of combinations of hashed block data and/or hashed block addresses from the new block and one or more preceding blocks, such that the address of the new block is dependent upon, or otherwise linked to, at least the immediately preceding block.

In some implementations, a cryptocurrency blockchain may contain data regarding a client's cryptocurrency. The CBS server 150a may manage a cryptocurrency blockchain, where each block instance within the blockchain represents a cryptocurrency amount and store pertinent data within the database 150b. Non-limiting examples of what may be stored in the database 150b may include: user records that may comprise data fields describing users (e.g., user data), such as user credentials (e.g., username, passwords, biometrics, encryption certificates), block addresses for blocks on the system blockchain, user account data, user roles or user permissions; document records that may comprise machine-readable computer files (e.g., word processing files), cryptocurrency records associated with each previous cryptocurrency amount, parsed portions of such computer files, or metadata associated with computer files; and application data that may include software instructions executed by a CBS server 150a or data used by the such applications executed by the CBS server 150a.

User records stored on the database 150b may comprise a data field containing a user-identifying hash value generated by the CBS server 150a according to a hashing algorithm implemented by a cryptocurrency blockchain, when a new user record is generated or updated. The hash value may be generated using one or more data fields that describe the user, which may be entered by a user via a website portal or pulled from the user record in the database 150b. The hash value may be a unique identifier for the particular user record, and may be used by various computing devices of the CBS 101 to reference the user data, which may be stored in the database 150b and/or on blocks of the cryptocurrency blockchain that is hosted on network nodes 180a-c or 190a-c. The database 150b may be hosted on any number computing devices comprising a non-transitory machine-readable storage medium and capable of performing the various tasks described herein. The database 150b may be accessed by the CBS server 150a via one or more networks.

Document records stored on the system database 110b may comprise a data field containing document-identifying hash values generated by the analytics server 110a according to a hashing algorithm implemented by a system blockchain, when a new document record containing a machine-readable computer file (e.g., PDF, DOC, XSL), such as an cryptocurrency recognition or award documents, is generated or updated. The hash value may be generated using one or more data fields that describe the computer file, which may be uploaded by a user via a website portal or pulled from the document record within the system database 110b. The hash value may be a unique identifier for the particular document record, and may be used by various computing devices of the system 100, such as the system database 110b, to reference the computer file or metadata describing the computer file, which may be stored in the database 150b and/or on block instance of the system blockchain that is hosted on network nodes 180a-c or 190a-c.

A key storage database 150c, sometimes referred in the art as a high security module, key appliance, certificate authority, or the like, may be a computing device configured to manage and distribute encryption keys and cryptographic certificates to various computing devices in the CBS 101 according to predetermined roles and rules. In some implementations, encryption keys may be used for authentication of users when users log into the CBS server 150*a* via a CBS API in the WMS server 110*a*. In some implementations, encryption keys may be used to encrypt the data within the block instance of the cryptocurrency blockchain. Additionally or alternatively, encryption keys may be used to confirm, or "sign," data transfers to confirm to a data transfer recipient that the data originated from a known party. The key storage database 150*c* may be hosted on any number computing devices comprising a non-transitory machine-readable storage medium and capable of performing the various tasks described herein. The key storage database 150*c* may be accessed by the CBS server 150*a* via one or more networks, but the key storage database 150*c* may also be accessed by the client computing device 120, the advisor computing device 160, and network nodes 180*a-c* or 190*a-c* to retrieve or confirm encryption keys or encryption key signatures. Moreover, the key storage database 150*c* may be hosted on the CBS server 150*a* or on the same physical computing device functioning as the CBS server 150*a*.

Network nodes 180*a-c* may represent an amount of the user's cryptocurrency and may host one or more blocks of the first cryptocurrency blockchain. A network node 180*a-c* may be any computing device comprising a processor and a non-transitory machine-readable storage medium capable of performing the various tasks and processes described herein. Non-limiting examples of a network node may be a workstation computer, laptop computer, tablet computer, and server computer. Although the network nodes 180*a-c* are described as storing blocks of the blockchain in FIG. 1, other computing devices, such as an CBS server 150*a*, may host blocks of the blockchain. Each network node 180*a-c* locally stores an instance of the cryptocurrency blockchain in the storage medium of the cryptocurrency blockchain, and further executes a software application that instructs the network node 180*a-c* on generating and querying blocks within the locally stored blockchain instance.

Similarly, network nodes 190*a-c* may represent an amount of the user's cryptocurrency and may host one or more blocks of the second cryptocurrency blockchain which is different from the first cryptocurrency blockchain. A network node 190*a-c* may be any computing device comprising a processor and a non-transitory machine-readable storage medium capable of performing the various tasks and processes described herein. Non-limiting examples of a network node may be a workstation computer, laptop computer, tablet computer, and server computer. Although the network nodes 190*a-c* are described as storing blocks of the blockchain in FIG. 1, other computing devices, such as an CBS server 150*a*, may host blocks of the blockchain. Each network node 190*a-c* locally stores an instance of the cryptocurrency blockchain in the storage medium of the cryptocurrency blockchain, and further executes a software application that instructs the network node 190*a-c* on generating and querying blocks within the locally stored blockchain instance.

In operation, a network node may generate new blocks on a locally stored instance of the cryptocurrency blockchain according to data received from a CBS server 150*a* or other network nodes 180*a-c* or 190*a-c*. In some instances, the CBS server 150*a* may update a local block instance stored on the CBS server 150*a* (e.g., within the database 150*b*), and then instructs one or more of the network nodes 180*a-c* or 190*a-c* to update each block instance stored in their local storage (e.g., local database). Moreover, the CBS server 150*a* may query the block instances of the cryptocurrency blockchain according to a block address stored in the database 150*b*. When the CBS server 150*a* executes the query of the blocks on the cryptocurrency blockchain, the CBS server 150*a* may poll the network nodes 180*a-c* or 190*a-c* to determine the most recent data on the system blockchain (e.g., latest valid blockchain). The CBS server 150*a* may be confident that the data at block is the desired data according to a voting mechanism encoded within the blockchain software executed by the network nodes 180*a-c* or 190*a-c*. Each network node 180*a-c* or 190*a-c* may receive the query for the block instance and block address, and return a response to the CBS server 150*a* indicating whether the block address contains the desired data. The CBS server 150*a* may select this method to combat possible fraud and to be certain that data in the blockchain is resistant to corruption, as each block instance on each network node 180*a-c* or 190*a-c* would need to be corrupted in the same way so that each block address is corrupted in the same way. Similarly, in this way, the CBS server 150*a* may be prevented from acting on obsolete data. For instance, a network node 180*a-c* or 190*a-c* may attempt to modify information about a user's cryptocurrency amount. By modifying the information within the block instance, the hash value of said block instance may change, which would result in the block instance being disconnected from other block instances within the blockchain.

Figure 2:
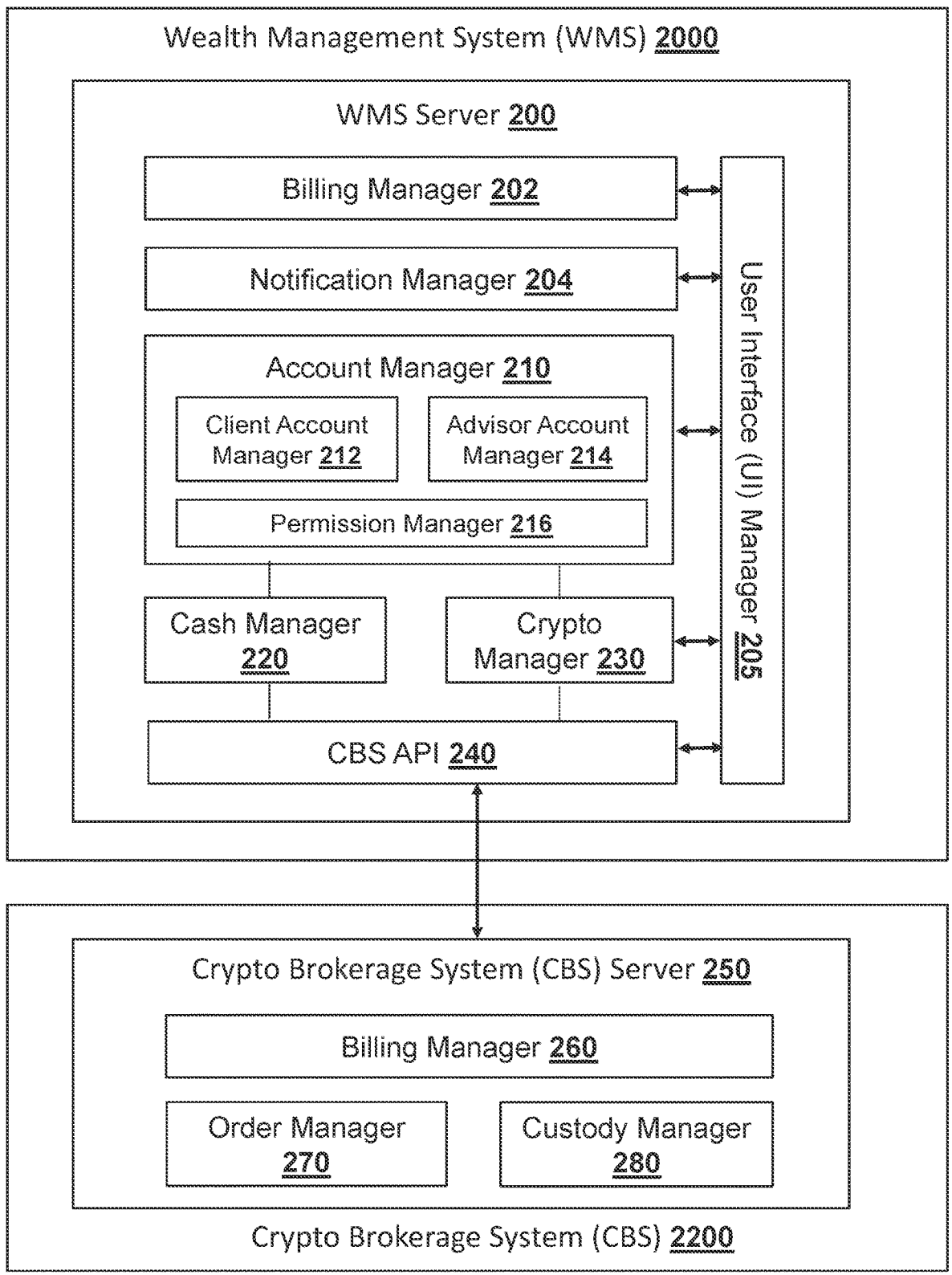
FIG. 2 illustrates a block diagram of a wealth management environment, according to an embodiment.

FIG. 2 illustrates a block diagram of a wealth management environment including a wealth management system (WMS) 2000 and crypto brokerage system (CBS) 2200, according to an embodiment. The WMS 2000 may include a WMS server 200. The WMS server 200 may include a billing manager 202, a notification manager 204, a user interface (UI) manager 205, an account manager 210, a cash manager 220, a crypto manager 230, and a CBS API 240, each of which may be a software module executable by a processor (e.g., CPU) with memory (e.g., RAM) of the WMS server 200.

The billing manager 202 may be configured to implement a process to perform collection of two types of crypto account fees: transaction fees and custody fees and sharing the crypto account fees between a WMS (e.g., WMS 2000) and a CBS (e.g., CBS 2200). In some embodiments, the billing manager 202 may be configured to (1) define a hierarchy in a billing system such that USD is taken first before any cryptoassets are sold, (2) implement a process to sell cryptoassets to pay custody fees if a given has insufficient USD, (3) implement a process to waive transaction fees on cryptoasset sales initiated to pay custody fees, (4) implement a simple, more manual process for withdrawing custody fees, (5) implement a process for reconciling the custody fees prior to debiting the fees, (6) create a billing system to run quarterly to debit gross custody fees from WMS customer accounts, (7) use the exception report to procure fees owed from customers, and/or (8) implement a process to encumber USD/crypto on the accrued fees to date to mitigate risk of insufficient funds in the WMS accounts, and/or (9) implement a process to allow customers to pay custody fees from their cash accounts via a recurring quarterly transfer.

The notification manager 204 may be configured to send trade and transfer notifications to clients or advisors. In some embodiments, the notification manager 204 may be configured to (1) send trade and transfer notifications to advisors regarding crypto accounts, (2) send trade and transfer notifications to advisors regarding only such crypto accounts in which the advisors are involved or if the advisors have discretion over the accounts, (3) send a notification to the client that a new WMS crypto account has been opened, (4)

send a notification to one or more advisors of the client that a new WMS crypto account has been opened, (5) send a notification to the client when wire arrives (e.g., the same day), (6) a notification to one or more advisors of the client when wire arrives (e.g., same day), (7) send a notification to one or more advisors of the client that the transfer has been created, and send a notification to the one or more advisors when the transfer arrives (e.g., next business day), and/or (8) send a notification to the client that the transfer has been created, and send a notification to the client when the transfer arrives (e.g., next business day).

The UI manager 205 may be configured to manage a user interface (UI) or a graphical user interface (GUI) to provide information to, or receive information/instructions from, clients or advisors. In some embodiments, the UI manager 205 may be configured to (1) allow clients to buy and sell crypto via the UI, (2) allow advisors (e.g., RIAs) to buy and sell crypto via the UI, (3) provide live pricing via the UI, (4) allow clients to grant advisors discretion via the UI, and/or (5) display to the advisor execution details of the order or trade using the identifiers or credentials of the advisor identified by the API.

The account manager 210 may include a client account manager 212, an advisor account manager 214, and a permission manager 216, which are configured to manage client accounts, and advisor accounts, and permissions of advisors associate with client accounts, respectively. In some embodiments, the account manager 210 may be configured to (1) allow clients to open new crypto accounts via a user interface (UI), (2) allow advisors to view client crypto accounts and positions via an advisor dashboard with the ability to filter by different parameters, (3) support different account types for different crypto accounts (e.g., individual accounts and other account types), (4) define or specify a client-advisor relationship stored in the system database 110b, e.g., which advisor or advisors are associated with each client, (5) specify, in the system database 110b, whether each client account is discretionary or not, (6) specify, in the system database 110b, whether an advisor has a trading permission with respect to a particular crypto account, and/or a particular client. The account manager 210 may also (7) specify, in the system database 110b, whether an advisor has a transfer permission with respect to a particular crypto account, and/or a particular client. For instance, the account manager 210 may update a data table indicating that a certain advisor is prohibited from transferring cryptocurrency to a certain account or prohibited from transactions above a certain defined amount without an authorization from the client (cryptocurrency owner).

The account manager 210 may also (8) allow the client to choose a WMS cash account or a WMS crypto account to open, (9) allow the client to provide, via the client account manager, Know Your Customer (KYC) information, (10) allow the client to accept account terms, (11) open a WMS crypto account after or in response to approving the screening results of KYC and/or sanctions, (12) determine whether the client already has a WMS cash account or not, (13) allow the client to navigate to a WMS crypto account, (14) identify a list of client accounts that the advisor can access and/or manage by accessing a database storing a client-advisor relationship (e.g., database 110b in FIG. 1), (15) allow the advisor to navigate to a WMS crypto account of a particular client, (16) allow an advisor to only trade in a crypto account if the crypto account is discretionary, and the advisor has a trading permission, (17) allow an advisor to only place a USD transfer in a crypto account if the crypto account is discretionary, and the advisor has a transfer permission, (18) allow clients to grant permission to their advisor to create transfers to or from their crypto accounts and their cash accounts, (19) allow clients to grant permission to their advisor(s) to create transfers to or from their crypto accounts and external bank accounts.

The cash manager 220 may be configured to perform processes related with a WMS cash account (e.g., trade, fund, custody, billing for cash accounts). In some embodiments, the manager 220 may be configured to (1) perform a WMS cash opening flow, (2) allow clients to initiate cash transactions between cash accounts and crypto accounts, and/or (3) create transfers to or from their crypto accounts and their cash accounts.

The crypto manager 230 may be configured to perform processes related with a WMS crypto account (e.g., trade, fund, custody, billing for crypto accounts). In some embodiments, the crypto manager 230 may be configured to (1) allow the client or advisor to view, via crypto manager 220, crypto funding options, (2) create, via crypto manager 230, a transfer from the WMS cash account to a WMS crypto account of the client, (3) allow a client or advisor to open, via crypto manager 230, a trade portal page and enter order details for a crypto order, (4) allow a client or advisor to place, via the crypto manager, a crypto order, (5) route or submit the order to a CBS (e.g., CBS server 250), (6) display execution details of the order or trade, and/or balance and activity pages which reflect an executed trade, and/or (7) display to the advisor execution details of the order or trade using the identifiers or credentials of the advisor identified by the API.

The CBS API 240 may be configured to allow a client or an advisor of a WMS (e.g., WMS 2000 in FIG. 2) to automatically log into a CBS (e.g., CBS 2200 in FIG. 2) and perform crypto-related processes (e.g., trade, fund, custody, billing for crypto accounts) using the corresponding functions of the CBS. In some embodiments, the CBS API 240 may be configured to (1) return a fee along with a crypto asset purchase and/or a sale transaction when querying the API, (2) render cryptocurrency services (e.g., order, trade, custody, or billing) to a client computing device or an advisor computing device, (3) route or submit the order to a CBS (e.g., CBS server 250), (4) fill the order and return execution details to the WMS server (e.g., crypto manager 230), (5) in submitting the order to the CBS identify an identifier or credential of the particular client based on an identifier or credential of the advisor using the client-advisor relationship stored in the database, and then submit the order to the CBS using the identifier or credential of the particular client. Identifiers or credentials may be stored in a database (e.g., database 110b in FIG. 1), and/or (6) identify not only the identifier or credential of the particular client used for placing the order, but also identify an identifier or credential of the advisor based on the identifier or credential of the particular client, using the client-advisor relationship stored in the database.

The CBS 2200 may include a CBS server 250. The CBS server 250 may include a billing manager 260, an order manager 270, and a custody manager 280, each of which may be a software module executable by a processor (e.g., CPU) with memory (e.g., RAM) of the CBS server 200.

The billing manager 260 may be configured to implement a process to bill on crypto allocations. In some embodiments, the billing manager 260 may be configured to (1) implement a process to collect the gross fees from customer accounts and remit the WMS's share of the revenue asynchronously, (2) implement a process to collect the gross fees and to collect transaction fees automatically at time of transaction, (3) implement a process to collect custody fees quarterly to align with quarterly billing schedules that are standard in the RIA market, (4) implement a process to waive transaction fees on cryptoasset sales initiated to pay custody fees, (5) automatically calculate and debit transaction fees at time of transaction, (6) return a fee along with a cryptoasset purchase and/or a sale transaction when querying the API, (7) implement a process to debit the gross custody from customer accounts and transfer the funds to a CBS revenue account, (8) implement a process for remitting WMS's share of revenue periodically, (9) create a billing system to run quarterly to debit gross custody fees from WMS customer accounts, (10) implement a process to rerun the CBS's custody fee billing system for specific accounts after the initial debit date to capture fees paid late, and/or (11) implement a process to ensure fees are appropriately collected to earn revenue.

The order manager 270 may be configured to place and execute a crypto trade or order upon receiving instructions from a client or an advisor of a WMS. In some embodiments, the order manager 270 may be configured to render cryptocurrency services related to crypto order or trade to a client computing device or an advisor computing device via a CBS API in a WMS server, fill the order and return execution details to the WMS server (e.g., crypto manager 230) via the API (e.g., CBS API 240) and/or return a fee along with a crypto asset purchase and/or a sale transaction when querying activity.

The custody manager 280 may be configured to render cryptocurrency services related to crypto custody to a client computing device or an advisor computing device via a CBS API in a WMS server.

Figure 3:
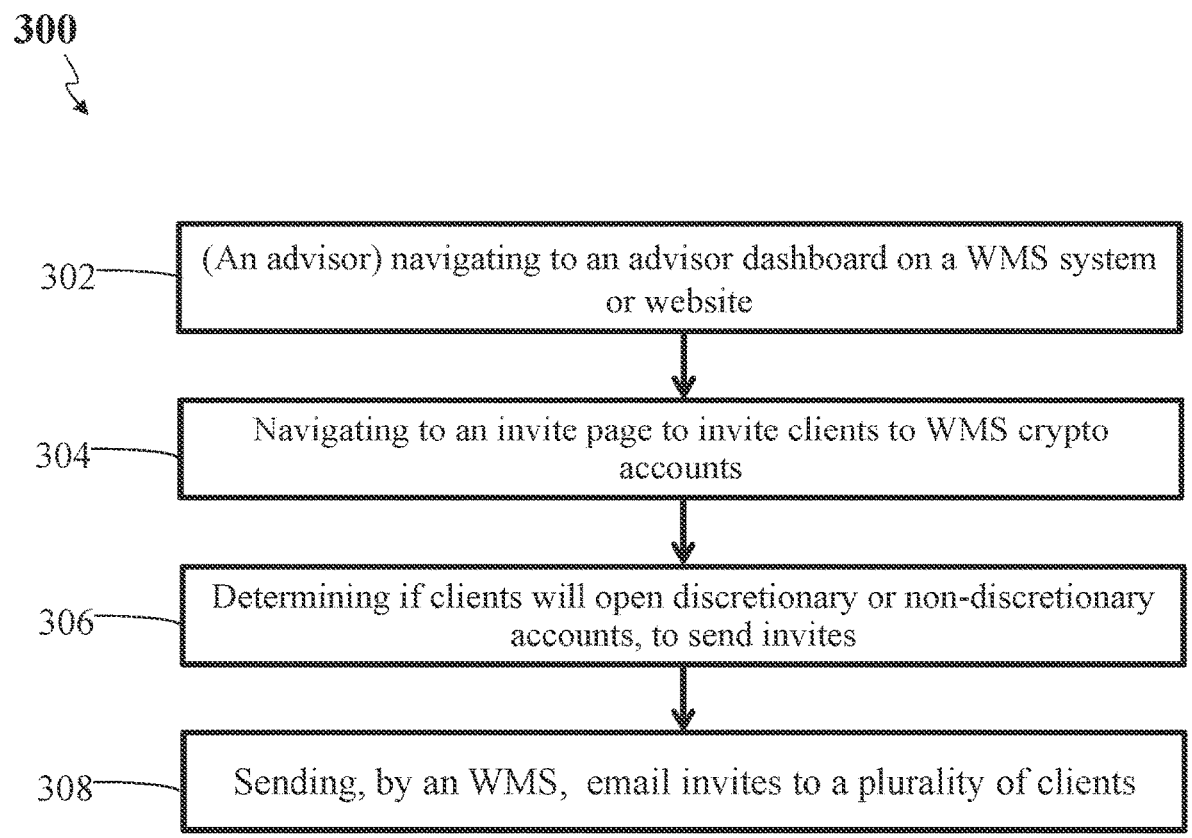
FIG. 3 illustrates a flow diagram of a process executed for an advisor inviting clients to a wealth management system (WMS) crypto account, according to an embodiment.

FIG. 3 illustrates execution of an exemplary method 300 for an advisor inviting clients to a WMS crypto account, according to an exemplary embodiment. Other embodiments of executing the method 300 may comprise additional or alternative steps, or may omit some steps altogether.

At step 302, an advisor may navigate to an advisor dashboard on a WMS system (e.g., WMS system 100 or 2000 in FIGS. 1 and 2) or a WMS website (e.g., WMS server 200 in FIG. 2). At step 304, the advisor may navigate to an invite page to invite clients to WMS crypto accounts. At step 306, the advisor may determine if clients will open discretionary accounts or non-discretionary accounts, to send email invites. At step 308, the advisor may send email invites to a plurality of clients via the WMS system (e.g., WMS server 200 or notification manager 204 in FIG. 2).

Figure 4:
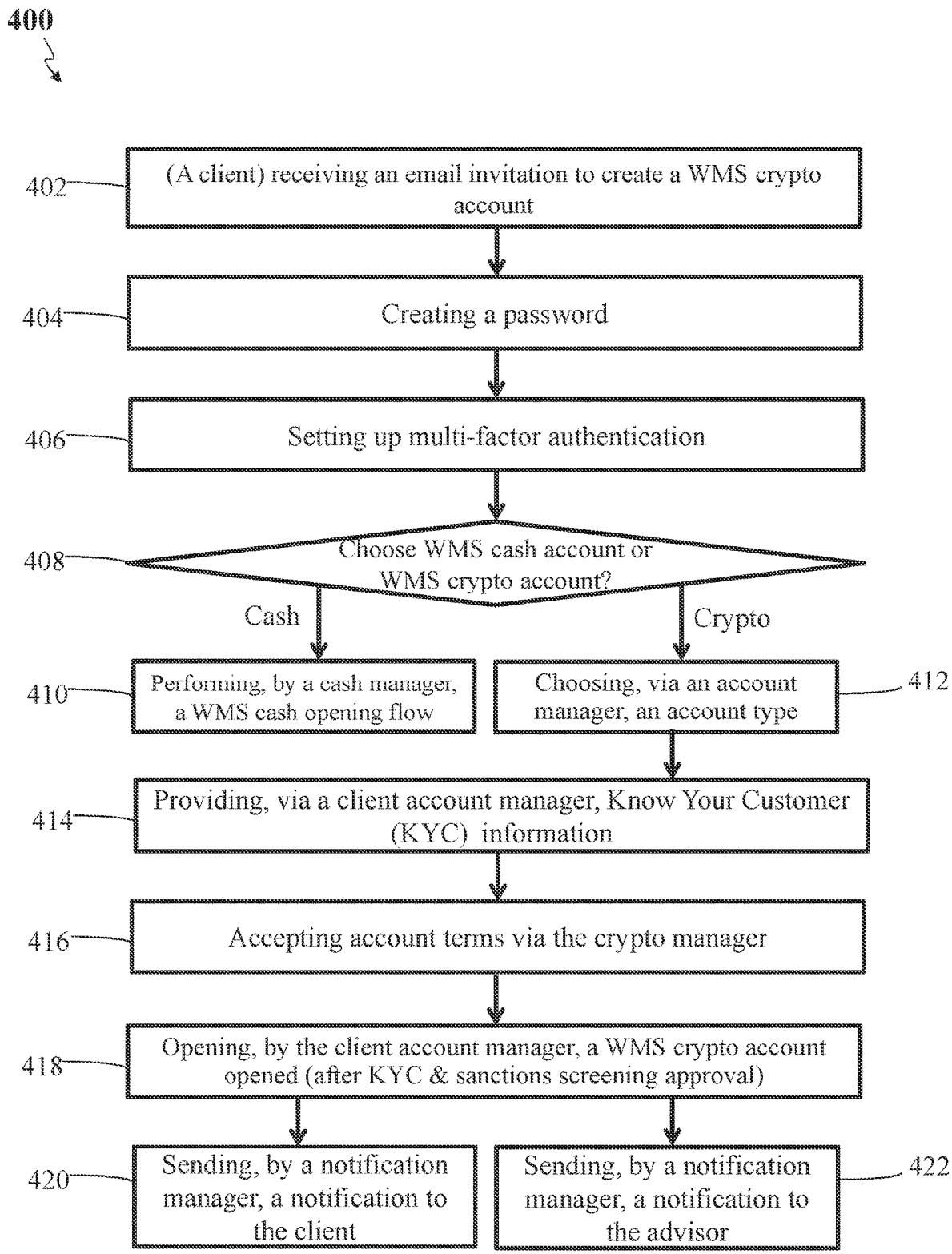
FIG. 4 illustrates a flow diagram of a process executed for a client opening a WMS crypto account, according to an embodiment.

FIG. 4 illustrates execution of an exemplary method 400 for a client opening a WMS crypto account, according to an exemplary embodiment. Other embodiments of executing the method 400 may comprise additional or alternative steps, or may omit some steps altogether.

At step 402, a client may receive an email invitation to create a WMS crypto account. At step 404, the client may create a password on a WMS system (e.g., WMS system 100 or 2000 in FIGS. 1 and 2) or a WMS website (e.g., WMS server 200 in FIG. 2). At step 406, the client may set up multi-factor authentication on the WMS system or the WMS website. At step 408, the client may choose a WMS cash account or a WMS crypto account, via the WMS server (e.g., account manager 210). At step 510, if the client chooses a cash account, the WMS server (e.g., cash manager 220 in FIG. 2) may perform a WMS cash opening flow. At step 512, if the client chooses a crypto account, the client may choose an account type via the WMS server (e.g., account manager 210 and/or client account manager 212 in FIG. 2). At step 514, the client may provide, via the client account manager, Know Your Customer (KYC) information. At step 516, the client may accept account terms via the client account manager. In some embodiments, screening of KYC and/or sanctions may be performed by a WMS system automatically or manually. At step 518, after or in response to approving the screening results of KYC and/or sanctions, the WMS server (e.g., client account manager) may open a WMS crypto account.

At step 520, the WMS server (e.g., notification manager 204 in FIG. 2) may send a notification to the client that a new WMS crypto account has been opened. At step 522, the WMS server (e.g., notification manager 204 in FIG. 2) may send a notification to one or more advisors of the client that a new WMS crypto account has been opened. The WMS server may regulate which advisor can receive notifications based on advisor and/or account attributes. For instance, in some configurations, sending advisor notifications will be limited to discretionary account types (indicated by the user or a system administrator).

Figure 5:
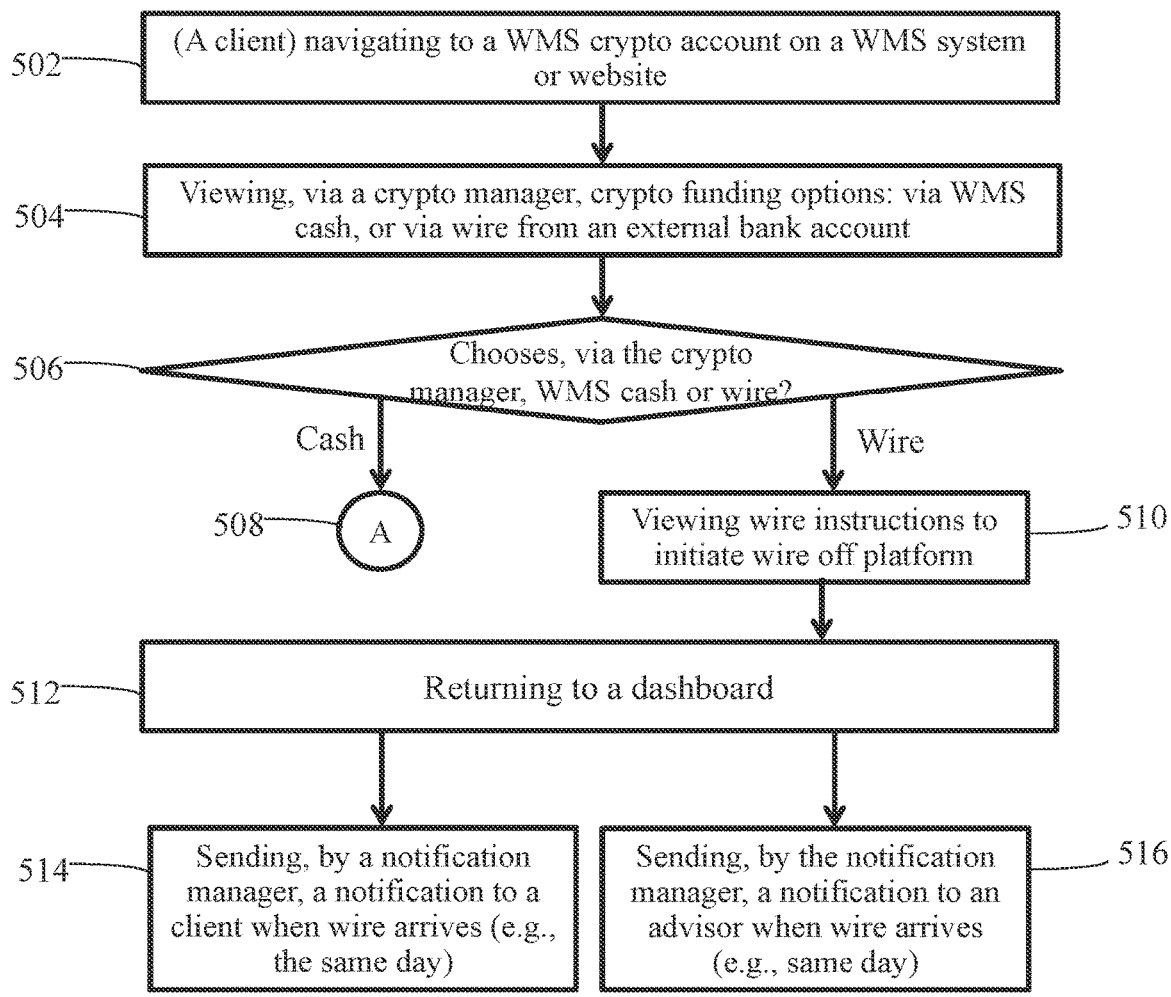
FIGS. 5 and 6 illustrate a flow diagram of a process executed for a client funding a WMS crypto account, according to an embodiment.
Figure 6:
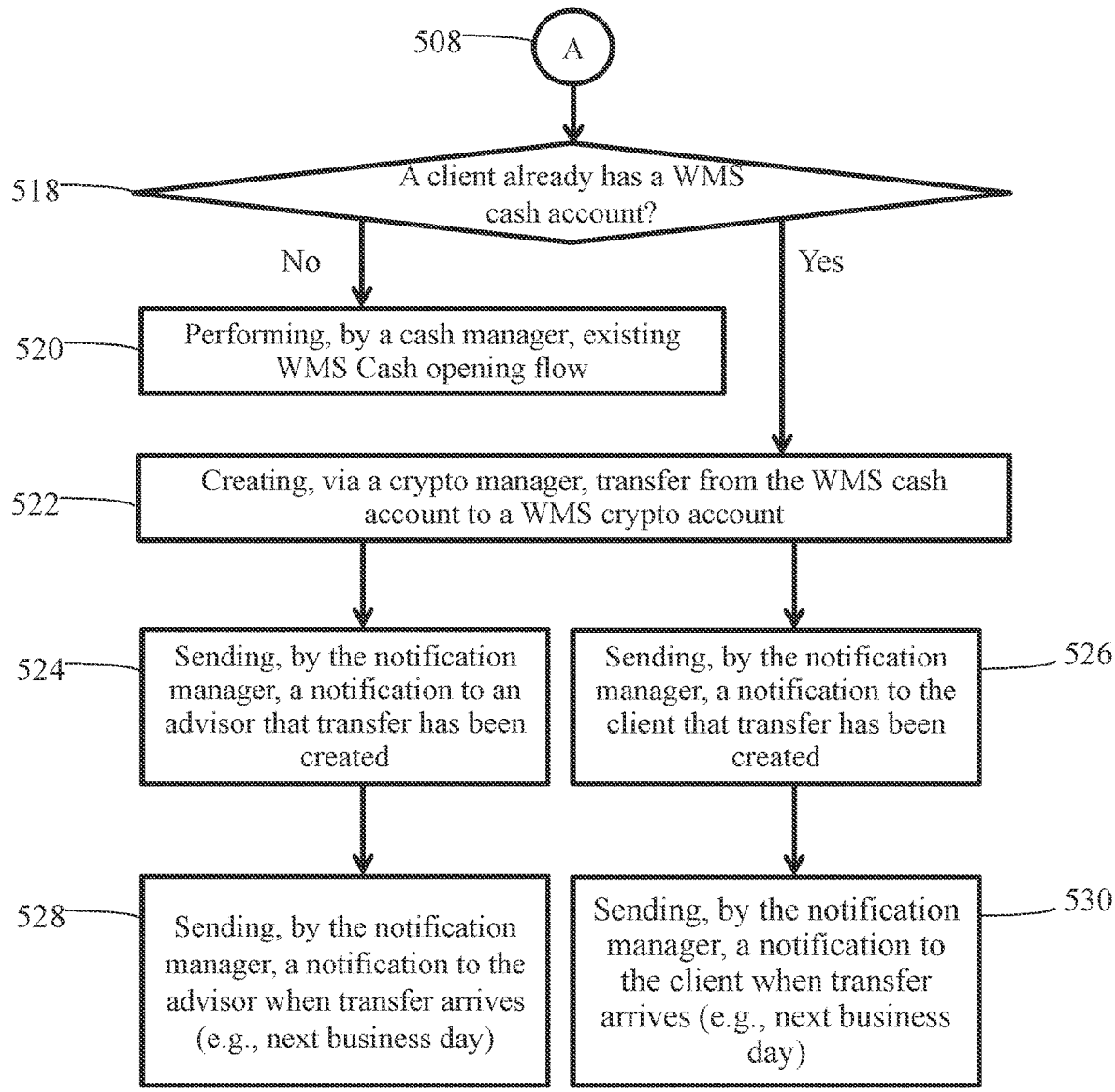

FIG. 5 and FIG. 6 illustrate execution of an exemplary method 500 for a client funding a WMS crypto account, according to an exemplary embodiment. Other embodiments of executing the method 500 may comprise additional or alternative steps, or may omit some steps altogether.

Referring to FIG. 5, at step 502, a client may navigate to a WMS crypto account on a WMS system (e.g., WMS system 100 or 2000 in FIGS. 1 and 2) or a WMS website (e.g., WMS server 200 in FIG. 2). At step 504, the client may view, via the WMS server (e.g., crypto manager 220 in FIG. 2), crypto funding options: via WMS cash, or via wire from an external bank account. At step 506, the client may choose, via the crypto manager, WMS cash or wire. At step 508, If the client chooses WMS cash, proceed to step 518 (see FIG. 7). At step 510, if the client chooses wire, the client may view wire instructions to initiate wire off platform. At step 512, the client may return to a dashboard on the WMS system or the WMS website. At step 514, the WMS server (e.g., notification manager) may send a notification to the client when wire arrives (e.g., the same day). At step 516, the notification manager may send a notification to one or more advisors of the client when wire arrives (e.g., same day).

Referring to FIG. 6, at step 518, the WMS server (e.g., account manager 210 or client account manager 212 in FIG. 2) may determine whether the client already has a WMS cash account or not. At step 520, if No, i.e., the client does not have a WMS cash account, the WMS server (e.g., cash manager 220) may perform a flow of opening a WMS cash account. At step 522, If Yes, i.e., the client already has a WMS account, the client may create, via the WMS server (e.g., crypto manager 230), transfer of an amount from the WMS cash account to a WMS crypto account of the client. At step 524, the WMS server (e.g., notification manager 204) may send a notification to one or more advisors of the client that the transfer has been created, and at step 528, the notification manager may send a notification to the one or more advisors when the transfer arrives (e.g., next business day). At step 526, the WMS server (e.g., notification manager 204) may send a notification to the client that the transfer has been created, and at step 530, the notification manager may send a notification to the client when the transfer arrives (e.g., next business day).

FIG. 7 illustrates execution of an exemplary method 700 for a client placing a crypto trade or order, according to an exemplary embodiment. Other embodiments of executing the method 700 may comprise additional or alternative steps, or may omit some steps altogether.

At step 702, a client may log into a WMS system (e.g., WMS system 100 or 2000 in FIGS. 1 and 2) or a WMS website (e.g., WMS server 200 in FIG. 2). At step 704, the client may land on a WMS client dashboard on the WMS system or the WMS website. At step 706, the client may navigate to a WMS crypto account via the WMS server (e.g., account manager 210 or client account manager 212 in FIG. 2). At step 708, the client may enter order details for a crypto order. In a non-limiting example, the client may open, via the WMS server (e.g., crypto manager 230 in FIG. 2), a trade portal page and enter a direction and an amount for a crypto order. At step 710, the client may place, via the crypto manager, an order. In some embodiments, orders placed by clients may be limit orders submitted to a crypto brokerage system (CBS), e.g., CBS server 150, 250 in FIGS. 1 and 2. At step 712, the WMS server (e.g., crypto manager 230) may route or submit the order to a CBS (e.g., CBS server 250) via an API (e.g., CBS API 240 in FIG. 2). At step 714, the CBS (e.g., order manager 270 in FIG. 2) may fill the order and return execution details to the WMS server (e.g., crypto manager 230) via the API (e.g., CBS API 240). At step 716, the WMS server (e.g., crypto manager 230 and UI manager 205 in FIG. 2) may display execution details of the order or trade. At step 718, the WMS server may display balance and activity pages which reflect an executed trade.

FIG. 8 illustrates execution of an exemplary method 800 for an advisor placing a crypto trade or order, according to an exemplary embodiment. Other embodiments of executing the method 800 may comprise additional or alternative steps, or may omit some steps altogether.

At step 802, an advisor of one or more clients may log into a WMS system (e.g., WMS system 100, or 2000 in FIGS. 1 and 2) or a WMS website (e.g., WMS server 200 in FIG. 2). At step 804, the advisor may navigate to a WMS advisor dashboard on the WMS system or the WMS website, and further navigate to a desired client household or account via the WMS server (e.g., account manager 210 or advisor account manager 214 in FIG. 2). In some embodiments, the advisor account manager 214 may identify a list of client accounts that the advisor can access and/or manage by accessing a database storing a client-advisor relationship (e.g., database 110b in FIG. 1). At step 806, the advisor may navigate to a WMS crypto account of a particular client via the WMS server (e.g., account manager 210 or advisor account manager 212 in FIG. 2). At step 808, the advisor may enter order details for a crypto order. In a non-limiting example, the advisor may open, via the WMS server (e.g., crypto manager 230 in FIG. 2), a trade portal page and enter a direction and an amount for a crypto order on behalf of the particular client. In some embodiments, an advisor can only trade in a crypto account if the crypto account is discretionary, and the advisor has a trading permission. At step 810, the advisor may place, via the crypto manager, an order on behalf of the particular client.

In some embodiments, orders placed by the advisor may be limit orders submitted to a crypto brokerage system (CBS), e.g., CBS server 150, 250 in FIGS. 1 and 2. At step 812, the WMS server (e.g., crypto manager 230) may route or submit the order to a CBS (e.g., CBS server 250) via an API (e.g., CBS API 240 in FIG. 2). In some embodiments, in submitting the order to the CBS, the API may identify an identifier or credential of the particular client based on an identifier or credential of the advisor using the client-advisor relationship stored in the database. The API may then submit the order to the CBS using the identifier or credential of the particular client. Identifiers or credentials may be stored in a database (e.g., database 110b in FIG. 1), and examples of identifiers or credentials include, but are not limited to, username, password, biometrics, cryptographic certificate, and the like.

At step 814, the CBS (e.g., order manager 270 in FIG. 2) may fill the order and return execution details to the WMS server (e.g., crypto manager 230) via the API (e.g., CBS API 240). In some embodiments, in returning execution details of the order to the WMS server, the API may identify not only the identifier or credential of the particular client used for placing the order, but also identify an identifier or credential of the advisor based on the identifier or credential of the particular client, using the client-advisor relationship stored in the database. At step 816, the WMS server (e.g., crypto manager 230 and UI manager 205 in FIG. 2) may display to the advisor execution details of the order or trade using the identifiers or credentials of the advisor identified by the API. At step 818, the WMS server may display to the advisor balance and activity pages which reflect an executed trade.

Figure 9:
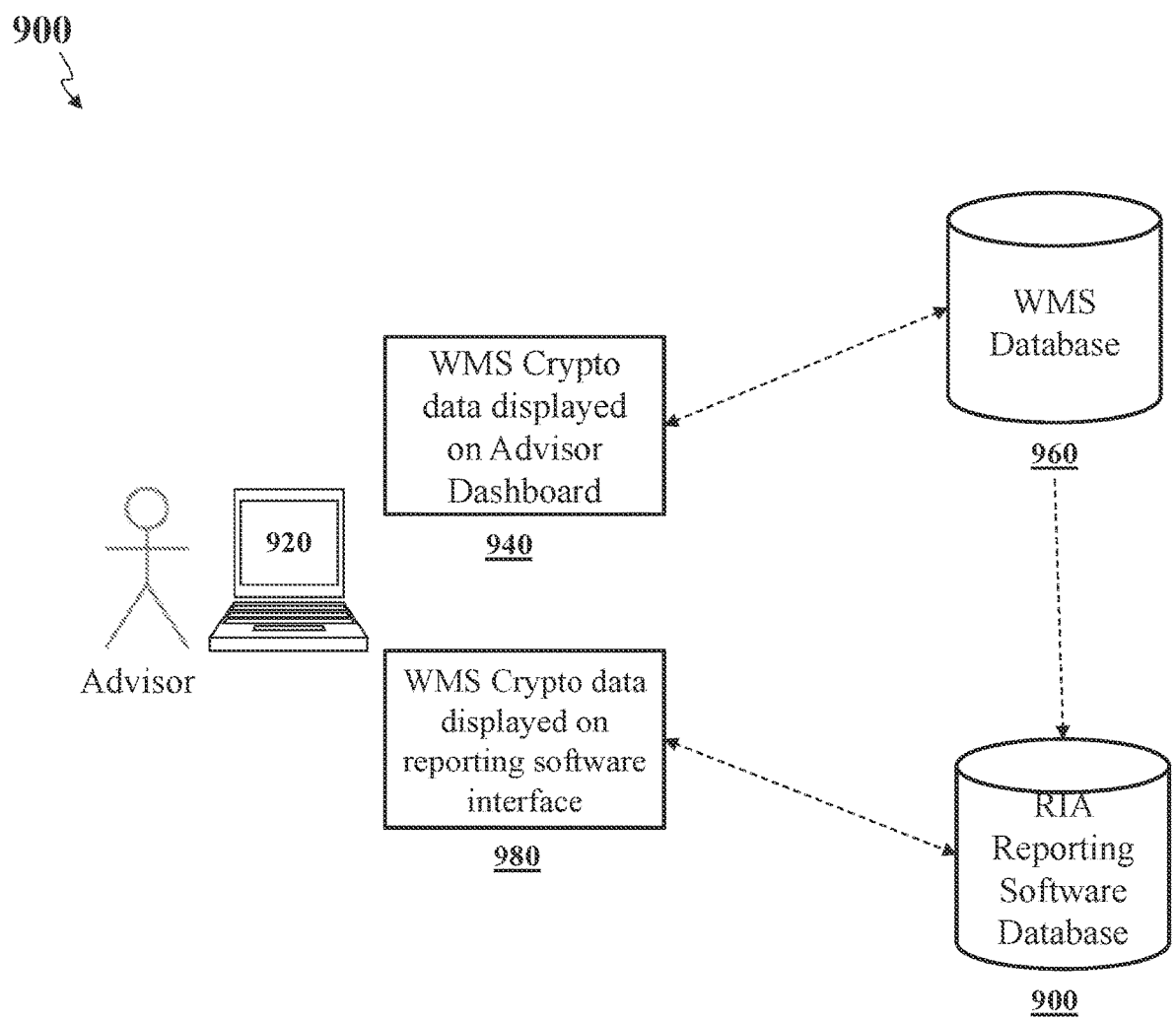
FIG. 9 illustrates an example of a system in which a WMS system is integrated with a reporting system for RIAs, according to an embodiment.

FIG. 9 illustrates an example of a system 900 in which a WMS system is integrated with a reporting system for registered investment advisors (RIA), according to an embodiment.

An advisor may view WMS crypto data 940 displayed on an advisor dashboard of a WMS system (e.g., system 100 in FIG. 1) on a computing device 920. The advisor can access or modify the crypto data 940 stored in a WMS database 960. The WMS database 960 may be automatically exported to an external RIA reporting software database. The RIA reporting software data may store data for RIA software such as Tamarac, Orion, eMoney, Black Diamond, etc. In some embodiments, data may be passed or communicated from the WMS database to the RIA reporting software database via flat files (e.g., via sFTP). In this manner, the advisor may view WMS crypto data 940 displayed on an interface of the RIA reporting system. Additionally, in some configuration, WMS may provide a two-way integration with the systems discussed herein. For instance, WMS may receive data and/or instructions (e.g., orders) from these systems.

FIG. 10 illustrates execution of a method 1000 for updating an amount of cryptocurrency associated with a second user credential based on a first user credentials, according to an embodiment. Other embodiments may comprise additional or alternative steps, or may omit some steps altogether.

In some embodiments, a system (e.g., a wealth management environment in FIG. 1) may allow a user (second user) and their advisor (first user) to have access to an account that controls cryptocurrency assets of a user. For instance, a second user (e.g., user who owns the cryptocurrency) may log into an account using a second user credential (e.g., username, passwords, biometrics, encryption certificates of the user). Then a first server (e.g., WMS server 110a, 200) may receive the second user's orders and instructions and transmit the order to a second server (e.g., CBS server 150a, 250). When the first user (e.g., advisor) logs into the same account using a first user credential to request a transaction, the first server first identifies whether the first user has proper authorization for the requested transaction before transmitting the request to the second server. In this way, the second user has unfettered access to the account (e.g., full permission to transact using the underlying cryptocurrency) and the first user only has a subset of the permissions granted to the second user.

At step 1002, the processor of the first server may be configured to receive, from the first computing device, a first request associated with the first user credential (e.g., a crypto order placed by the advisor) on behalf a second user credential of a client to transact cryptocurrency. The amount of cryptocurrency may correspond to a first block instance on the blockchain (e.g., blockchain 180).

The second user credential may have a set of permissions for transactions of the cryptocurrency on the blockchain. The first user credential may have a subset of the set of permissions for transactions of the cryptocurrency on the blockchain and excludes transactions directly to a cryptocurrency account. For example, the second user (e.g., the client) may have full access to conduct transactions with the cryptocurrency, whereas first user (e.g., the advisor) may have limited access. In an example of the limited access of the first user, the subset of the set of permissions may exclude transactions directly to an account (e.g., the advisor cannot transfer cryptocurrency from the client's account to another user's account).

At step 1004, in response to determining that the first user credential has a permission to make the first request, updating, by the processor, based on the request and the second user credential, a cryptocurrency wallet associated with the first user in accordance with the amount of cryptocurrency associated with the second user credential and the transaction. For example, the CBS (e.g., order manager 270 in FIG. 2) may fill the order and return execution details to the WMS server (e.g., crypto manager 230) via the API (e.g., CBS API 240). In some embodiments, in returning execution details of the order to the WMS server, the API may identify not only the identifier or credential of the particular client used for placing the order, but also identify an identifier or credential of the advisor based on the identifier or credential of the particular client, using the client-advisor relationship stored in the database.

In one embodiment, in response to determining that the first user credential has a permission to make the first request, the processor of the first server may be configured to convert the first request associated with the first user credential (e.g., a crypto order based on a credential of an advisor) to a second request associated with the second user credential (e.g., a crypto order based on a credential of a client). For example, a CBS API (e.g., CBS API 240 in a WMS server 200) may identify an identifier or credential of a second user (e.g., a client) based on an identifier or credential of the first user (e.g., the advisor of the client) using the client-advisor relationship stored in the database (e.g., database 110b in FIG. 1). The CBS API may then submit the order associated with the identifier or credential of the second user (e.g., client) to the CBS. The processor of the second server may then be configured to receive, from the first server, the second request (e.g., a crypto order) and the second user credential (e.g., the identifier or credential of the client).

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
receiving, by a processor, from an account accessed with a second user credential of a second user on a first computing device, an instruction to transact cryptocurrency;
transmitting, by the processor, the instruction to a second computing device;
receiving, by the processor, from the account accessed with a first user credential of a first user on the second computing device, a first request associated with the first user credential of the first user on behalf of the second user credential of the second user to transact cryptocurrency, an amount of cryptocurrency corresponding to a first block instance of a blockchain stored on a plurality of first network nodes,
wherein the first request is associated with the instruction,
wherein the second user credential includes a set of permissions for a category of transactions of the cryptocurrency on the blockchain, and
wherein the first user credential includes a subset of the set of permissions for the category of transactions of the cryptocurrency on the blockchain, the subset of the set of permissions for the category of transactions of the cryptocurrency on the blockchain excluding transactions directly to a cryptocurrency account; and
in response to determining that the first user credential has a permission to make the first request:
converting, by the processor, the first request associated with the first user credential to a second request associated with the second user credential and in accordance with the subset of the set of permissions for the category of transactions of the cryptocurrency; and
updating, by the processor, based on the second request and the second user credential, a cryptocurrency wallet of a plurality of users including the first user in accordance with the amount of cryptocurrency associated with the second user credential.

2. The method of claim 1, wherein updating the cryptocurrency wallet comprises instructing an exchange server to update the cryptocurrency wallet.

3. The method of claim 1, wherein updating the cryptocurrency wallet comprises requesting an exchange server to update a blockchain associated with the cryptocurrency wallet.

4. The method of claim 1, wherein the first user credential is excluded from transferring the cryptocurrency from an account of the second user to an account of another user.

5. The method of claim 1, wherein the second user owns the cryptocurrency.

6. The method of claim 1, wherein updating the cryptocurrency wallet comprises:
sending, by the processor to an exchange server, the second request and the second user credential to update the amount of cryptocurrency associated with the second user credential.

7. The method of claim 6, wherein converting the first request to the second request comprises:
identifying, by the processor, the second user credential of the second user based on the first user credential of the first user using a relationship between the first user and the second user, stored in a database.

8. A system comprising a processor, wherein the processor is configured to:
receive, from an account accessed with a second user credential of a second user on a first computing device, an instruction to transact cryptocurrency;
transmit the instruction to a second computing device;
receive, from the account accessed with a first user credential of a first user on the second computing device responsive to transmitting the instruction, a first request associated with the first user credential of the first user on behalf of the second user credential of the second user to transact cryptocurrency, an amount of cryptocurrency corresponding to a first block instance of a blockchain stored on a plurality of first network nodes,
wherein the first request is associated with the instruction,
wherein the second user credential includes a set of permissions for a category of transactions of the cryptocurrency on the blockchain, and
wherein the first user credential includes a subset of the set of permissions for the category of transactions of the cryptocurrency on the blockchain, the subset of the set of permissions for the category of transactions of the cryptocurrency on the blockchain excluding transactions directly to a cryptocurrency account; and
in response to determining that the first user credential has a permission to make the first request:
convert the first request associated with the first user credential to a second request associated with the second user credential and in accordance with the subset of the set of permissions for the category of transactions of the cryptocurrency; and
update, based on the first request and the second user credential, a cryptocurrency wallet of a plurality of users including the first user in accordance with the amount of cryptocurrency associated with the second user credential.

9. The system of claim 8, wherein in updating the cryptocurrency wallet, the processor is configured to instruct an exchange server to update the cryptocurrency wallet.

10. The system of claim 8, wherein in updating the cryptocurrency wallet, the processor is configured to request an exchange server to update a blockchain associated with the cryptocurrency wallet.

11. The system of claim 8, wherein the first user credential is excluded from transferring the cryptocurrency from an account of the second user to an account of another user.

12. The system of claim 8, wherein the second user owns the cryptocurrency.

13. The system of claim 8, wherein in updating the cryptocurrency wallet, the processor is configured to:
send, to an exchange server, the second request and the second user credential to update the amount of cryptocurrency associated with the second user credential.

14. The system of claim 13, wherein in converting the first request to the second request, the processor is configured to:
identify the second user credential of the second user based on the first user credential of the first user using a relationship between the first user and the second user, stored in a database.

15. A non-transitory computer readable medium storing program instructions for causing a processor to:

receive, from an account accessed with a second user credential of a second user on a first computing device, an instruction to transact cryptocurrency;

transmit the instruction to a second computing device;

receive, from the account accessed with a first user credential of a first user on the second computing device responsive to transmitting the instruction, a first request associated with the first user credential of the first user on behalf of the second user credential of the second user to transact cryptocurrency, an amount of cryptocurrency corresponding to a first block instance of a blockchain stored on a plurality of first network nodes, wherein the first request is associated with the instruction, wherein the second user credential includes a set of permissions for a category of transactions of the cryptocurrency on the blockchain, and wherein the first user credential includes a subset of the set of permissions for the category of transactions of the cryptocurrency on the blockchain, the subset of the set of permissions for the category of transactions of the cryptocurrency on the blockchain excluding transactions directly to a cryptocurrency account; and in response to determining that the first user credential has a permission to make the first request:

convert the first request associated with the first user credential to a second request associated with the second user credential and in accordance with the subset of the set of permissions for the category of transactions of the cryptocurrency; and update, based on the first request and the second user credential, a cryptocurrency wallet of a plurality of users including the first user in accordance with the amount of cryptocurrency associated with the second user credential.

16. The non-transitory computer readable medium according to claim 15, wherein in updating the cryptocurrency wallet, the processor is caused to instruct an exchange server to update the cryptocurrency wallet.

17. The non-transitory computer readable medium of claim 15, wherein in updating the cryptocurrency wallet, the processor is caused to request an exchange server to update a blockchain associated with the cryptocurrency wallet.

18. The non-transitory computer readable medium of claim 15, wherein the first user credential is excluded from transferring the cryptocurrency from an account of the second user to an account of another user.

19. The non-transitory computer readable medium of claim 15, wherein in updating the cryptocurrency wallet, the processor is caused to:

send, to an exchange server, the second request and the second user credential to update the amount of cryptocurrency associated with the second user credential.

20. The non-transitory computer readable medium of claim 19, wherein in converting the first request to the second request, the processor is caused to identify the second user credential of the second user based on the first user credential of the first user using a relationship between the first user and the second user, stored in a database.

* * * * *